United States Patent [19]
Hess et al.

[11] Patent Number: 5,548,837
[45] Date of Patent: Aug. 20, 1996

[54] METHOD AND APPARATUS FOR PRODUCING DIVERSITY GAIN OF A RECEIVED SIGNAL

[76] Inventors: Garry C. Hess, 38W711 Hogan Hill, Elgin, Ill. 60123; Allen L. Davidson, 3502 Crystal Lake Ave., Crystal Lake, Ill. 60014

[21] Appl. No.: 218,385

[22] Filed: Mar. 28, 1994

[51] Int. Cl.$^6$ ............................................. H04B 7/08
[52] U.S. Cl. .................. 455/278.1; 455/276.1; 455/273; 455/52.3; 455/65; 375/347; 343/757
[58] Field of Search ............................. 455/226.3, 275, 455/278.1, 52.1, 52.3, 65, 276.1, 272, 226.1, 273, 63; 343/757, 760; 375/347

[56] References Cited

U.S. PATENT DOCUMENTS

| | | | |
|---|---|---|---|
| 3,922,685 | 11/1975 | Opas | 343/854 |
| 3,996,592 | 12/1976 | Kline et al. | 455/277.1 |
| 4,458,249 | 7/1984 | Valentino et al. | 343/754 |
| 4,777,653 | 10/1988 | Bonnerot et al. | 455/69 |
| 5,117,236 | 5/1992 | Chang et al. | 455/133 |
| 5,117,503 | 5/1992 | Olson | 455/51.1 |
| 5,303,240 | 4/1994 | Borras et al. | 455/33.3 |

FOREIGN PATENT DOCUMENTS

| | | | |
|---|---|---|---|
| 0480157 | 4/1992 | European Pat. Off. | 455/276.1 |

OTHER PUBLICATIONS

"High Speed Antenna" Rich Kommrusch Technical Developments, vol. 18, Motorola, Inc. Schaumburg, Illinois, Mar. 1993 p. 84.

"Wideband Phased Array Element With Rotatable Linear Polarization" George Scherer and Wolodymyr Mohuchy IIT Avionics Division Twenty-third U.S. Air Force Antenna Symposium Robert Allerton Park, Illinois, Oct. 1973 pp. 1–13.

*Primary Examiner*—Reinhard J. Eisenzopf
*Assistant Examiner*—Doris To
*Attorney, Agent, or Firm*—Daniel C. Crilly; James A. Coffing

[57] ABSTRACT

A receiver (100) that includes an antenna (101) employs a method and apparatus for producing diversity gain of a signal (106) received by the antenna (101), wherein the signal (106) is subject to a time-variant fading condition. Upon receiving the signal (106), the receiver (100) determines a signal quality metric of the signal (106) and compares the signal quality metric to a quality threshold. When the signal quality metric is below the quality threshold, the receiver (100) orients a predetermined antenna pattern (304) of the antenna (101) to improve the signal quality metric, thereby producing the diversity gain.

24 Claims, 3 Drawing Sheets

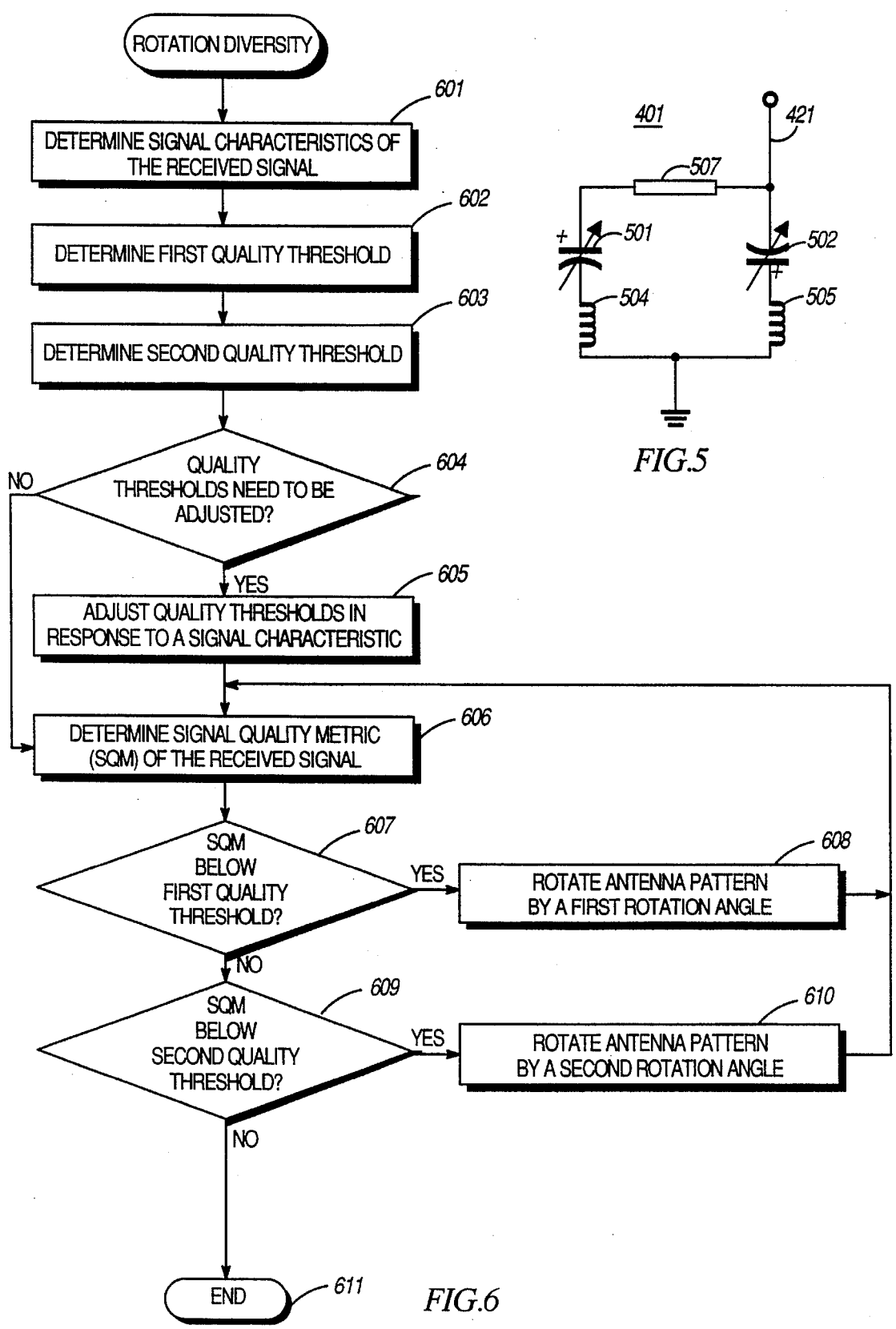

METHOD AND APPARATUS FOR PRODUCING DIVERSITY GAIN OF A RECEIVED SIGNAL

FIELD OF THE INVENTION

The present invention relates generally to radio communication receivers and, in particular, to a method and apparatus for producing diversity gain of a received signal.

BACKGROUND OF THE INVENTION

Communication receivers are known to comprise an antenna and a signal receiver that includes well-known receiver front-end and back-end circuitry, such as filters, frequency down-converters, analog-to-digital converters, and signal processing circuitry (e.g., a microprocessor or a digital signal processor). In a mobile application, the antenna typically comprises a one-quarter wavelength monopole that is characterized by a corresponding antenna pattern. However, at a base site, the antenna might alternately comprise an array of antenna elements, such as one-half wavelength dipoles, that are collectively characterized by an overall antenna pattern. The antenna pattern of each respective antenna determines the direction, or directions, from which a signal might be received by each antenna. For example, in the case of a one-quarter wavelength monopole projecting upward from an automobile's roof, the antenna pattern provides substantially omnidirectional reception in the horizontal plane.

As is also known, communication receivers are used to receive radio frequency (RF) signals that have been transmitted through an RF transmission medium, such as air. However, due to the presence of reflective objects between the transmitter and the communication receiver, the received signal is often altered in magnitude and phase as compared with the corresponding transmitted signal. This alteration—commonly referred to as fading—results from multiple reflections of the RF signal during transmission through the RF transmission medium. These reflections typically result from obstacles in the signal's path, such as walls, automobiles, or buildings, and may produce multiple modified replications of the signal, each introducing various amplitude and phase alterations of the original signal in each new signal path. All of the signal replicas form a composite signal at the communication receiver's antenna and account for the fading.

In order to mitigate the effects of fading, radio communication receivers typically employ diversity techniques to enhance the signal-to-noise ratio of the signal in a fading environment. Standard diversity techniques attempt to obtain multiple, decorrelated replicas of the transmitted signal—for example, by using multiple antennas typically spaced several wavelengths apart or by receiving redundant transmissions at predetermined time intervals. Thus, by receiving multiple copies of the transmitted signal, the diversity receiver produces an output signal with a better overall signal-to-noise ratio than if only one copy of the transmitted signal were received.

Three common diversity techniques are space diversity, time diversity, and frequency diversity. Space diversity is a technique typically used in a communication unit's (e.g., a mobile radio's) receiver, wherein at least two receiving antennas are separated in space by at least one-quarter wavelength and are used to receive decorrelated replicas of a transmitted signal. The signal received by each antenna is analyzed by the receiver to determine which of the received signals is more preferable. This analysis typically encompasses measuring a received signal strength indication (RSSI) of each signal. Subsequent to the analysis, each signal is weighted based on its respective RSSI, with a higher weighting given to the more preferable signal (i.e., the signal with the larger RSSI). The weighting may include attenuating, or even eliminating, one of the received signals. The weighted signals are then combined to provide a composite signal with an improved overall signal-to-noise ratio. Thus, space diversity requires electrical and mechanical hardware for at least two antennas. Since this additional hardware can be quite costly, users of communication receivers are often deterred from incorporating the improved reception performance provided by space diversity into their receivers.

Time diversity may be employed by a receiver in either a communication unit or a base station. Time diversity uses only one antenna, but requires the same information to be transmitted two, or more, times. The receiver independently receives each transmission and determines the respective signal quality of each received signal, typically via an RSSI. Similar to space diversity, each signal is subsequently weighted based on its respective RSSI and combined to provide a composite signal with an improved overall signal-to-noise ratio. However, due to the redundant transmission requirements of time diversity, the quantity of information (i.e., throughput) that may be transmitted during a particular time period is significantly limited by the necessity to transmit the same information multiple times.

Frequency diversity may also be used by a receiver in either a communication unit or a base station. Similar to time diversity, frequency diversity requires only one antenna. However, frequency diversity also necessitates the availability of multiple frequencies over which to transmit a signal. With frequency diversity, a signal is simultaneously transmitted by a transmitter over multiple frequency channels, wherein each frequency channel is sufficiently separated (typically by at least 1 MHz) in frequency to achieve decorrelation of the transmitted signals. The receiver simultaneously receives each transmission and determines the respective signal quality of each received signal, typically via an RSSI. Similar to space diversity and time diversity, each signal is subsequently weighted and combined to provide a composite signal with an improved overall signal-to-noise ratio. However, since frequency diversity requires the allocation of multiple frequencies, frequency diversity is inherently spectrally inefficient. That is, fewer communications can be transmitted in a particular frequency bandwidth, effectively resulting in higher costs to transmit in that bandwidth.

Therefore, a need exists for a method and apparatus that provides diversity gain to a received signal while remaining spectrally efficient, while facilitating high throughput capability, and while requiring only one antenna.

BRIEF DESCRIPTION OF THE DRAWINGS

FIG. 5 illustrates a schematic depiction of an adjustable impedance, in accordance with the present invention.

FIG. 6 illustrates an exemplary logic flow diagram of steps executed by a receiver to produce diversity gain of a received signal, in accordance with the present invention.

DESCRIPTION OF A PREFERRED EMBODIMENT

Generally, the present invention provides a method and apparatus for producing diversity gain of a signal received by an antenna in a receiver, wherein the signal is subject to a time-variant fading condition. Upon receiving the signal, the receiver determines a signal quality metric of the signal and compares the signal quality metric to a quality threshold. When the signal quality metric is below the quality threshold, the receiver orients a predetermined antenna pattern of the antenna to improve the signal quality metric, thereby producing the diversity gain. By producing diversity gain in this manner, the present invention obviates the need for either a second antenna or redundant signal transmissions, as is required by diversity methods of the prior art.

Figure 1:
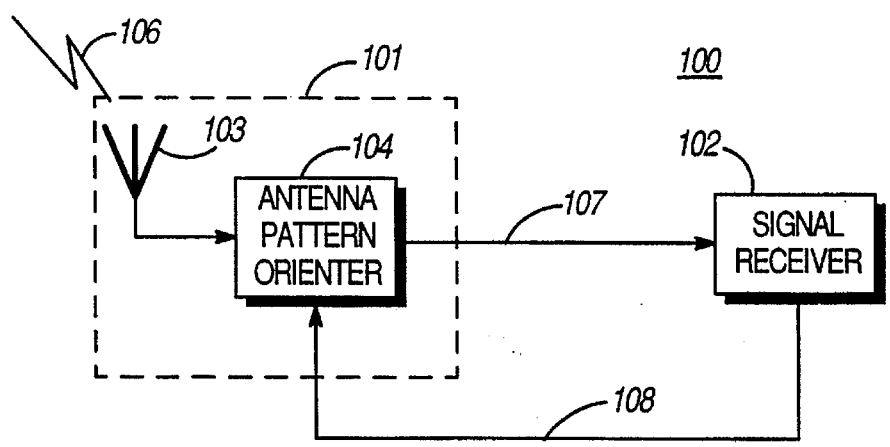
FIG. 1 illustrates a communication receiver, in accordance with the present invention.

The present invention can be more fully described with reference to FIGS. 1–6. FIG. 1 illustrates a receiver 100 that includes an antenna section 101 and a signal receiver 102, in accordance with the present invention. The antenna section 101 is characterized by a predetermined antenna pattern and includes at least one antenna element 103 and an antenna pattern orienter 104. In one embodiment of the present invention, the antenna section 101 might include only one antenna element 103, such as a center-fed dipole whose electrical length is approximately one-half the wavelength of the minimum operating frequency of the antenna section 101. In an alternate embodiment, the antenna section 101 might include two antenna elements 103, each element comprising a one-half wavelength center-fed dipole and being positioned substantially orthogonal to the other element. However, it is further understood that the antenna section 101 might alternatively comprise one, or more, of a variety of known antenna elements 103, such as one-half wavelength slots, patch radiators, or loops. In a preferred embodiment, the antenna elements 103 occupy a spatial aperture of, at most, one-half wavelength of the minimum operating frequency of the antenna section 101 (i.e., the elements 103 might reside in a sphere having a diameter of one-haft wavelength).

The antenna pattern orienter 104 provides a means for orienting the antenna's predetermined antenna pattern in response to a control signal 108 received from the signal receiver 102. In a preferred embodiment, the antenna pattern orienter 104 comprises two signal adjustment devices, each being operably coupled to a corresponding antenna element 103. The preferred antenna pattern orienter 104 is derailed below with reference to FIG. 2. In an alternate embodiment, the antenna pattern orienter 104 might comprise a motorized device (not shown), such as a stepper motor, that rotates the antenna element 103 in response to the control signal 108, thereby rotating the antenna pattern.

The signal receiver 102 preferably comprises well-known receiver front-end and back-end circuitry, such as filters, frequency down-converters, analog-to-digital converters, and signal processing circuitry (e.g., a microprocessor or a digital signal processor).

General operation of the receiver 100 and an implementation of the present invention occurs in the following manner. A signal 106 that is subject to a time variant fading condition (e.g., Rayleigh fading) is received by the antenna section 101, via the antenna element 103, based on the antenna's predetermined antenna pattern. The signal 106 preferably comprises data information that has been modulated, via quadrature amplitude modulation (QAM), onto a radio frequency (RF) carder. However, it is understood that other signals, such as modulated voice or other forms of modulated data, might alternatively be received.

In a preferred embodiment, the received signal 106 is provided as an input signal 107 to the signal receiver 102. The signal receiver 102 determines a signal quality metric of its input signal 107 and determines whether the signal quality metric is below a quality threshold, as later described. When the signal quality metric is below the quality threshold, the signal receiver sends a control signal 108, such as an AC or DC voltage, to the antenna pattern orienter 104. The control signal 108 directs the antenna pattern orienter 104 to orient the antenna pattern such that the signal quality metric of the signal receiver's input signal 107 improves to a level that is at, or above, the quality threshold. This signal quality improvement produces so-called diversity gain of the received signal 106. The amount of diversity gain is dependent upon the amount of time required to orient the antenna pattern at the desired orientation as compared to the average signal fade duration. In a preferred embodiment, the pattern orientation time is approximately one order of magnitude faster than the average Rayleigh fade duration (e.g., 10 milliseconds for an average fade duration of 100 milliseconds) to mitigate fades in excess of 10 dB.

In the manner described above, the present invention eliminates the need for multiple antennas, multiple transmission frequencies, or redundant transmissions, as is commonplace in the prior art, by rotating the antenna's antenna pattern to provide diversity gain to a received signal 106 using only one antenna section 101. In addition, the present invention substantially reduces the probability of producing distortion in the received signal 106 as a result of the fast, continuous rotation of the antenna and/or the antenna pattern as provided for by prior art antenna pattern rotation techniques. Accordingly, the present invention provides all the benefits of having receiver diversity, while reducing hardware requirements, improving spectral efficiency, and enhancing overall received signal quality.

Figure 2:
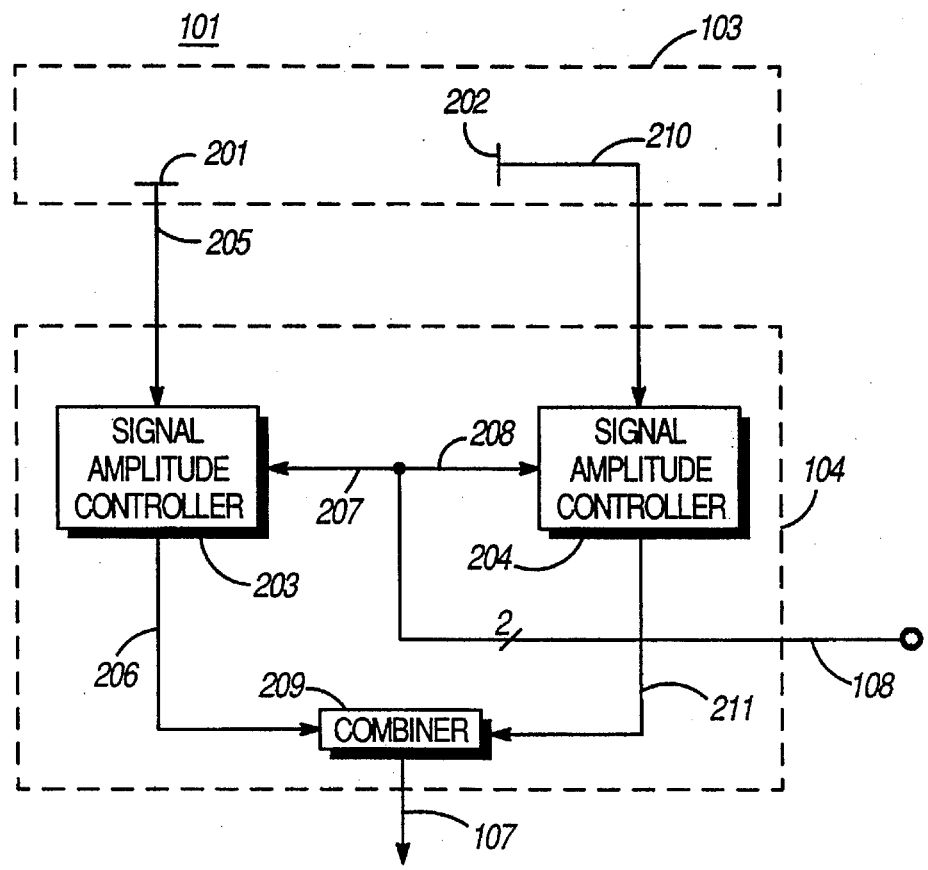
FIG. 2 illustrates a preferred embodiment of the antenna section shown in FIG. 1.

FIG. 2 illustrates a preferred embodiment of the antenna section 101, in accordance with the present invention, where the antenna section 101 includes two antenna elements 201,202 positioned substantially orthogonal to each other. As is known, each antenna element 201,202 is characterized by an associated antenna pattern. Thus, the combined effect of the two antenna patterns produces the antenna's composite antenna pattern, as later described.

The antenna pattern orienter 104 comprises two signal amplitude controllers 203, 204 operably coupled to their respective antenna elements 201,202 and a signal combiner 209. Each signal amplitude controller 203,204 preferably comprises a single phase, electrically controllable attenuator, as described in detail below. However, in an alternate embodiment, each signal amplitude controller 203, 204 might comprise a bi-phase, electrically controllable attenuator.

The combiner 209 preferably comprises a well-known distributed transmission line combiner, such as a directional coupler or a so-called hybrid combiner; while a discrete element combiner might alternatively be used depending on the size constraints of the antenna section 101. For example, a transmission line combiner might be used to combine signals when the antenna section 101 is not significantly size-limited; whereas, a discrete combiner might be used to combine signals when the antenna section 101 is significantly size-limited—for example, within an integrated circuit.

In a preferred embodiment, diversity gain is established when the antenna section 101 effectively rotates the predetermined antenna pattern by a rotation angle in response to the control signal 108. The control signal 108 comprises two DC bias voltages 207,208, each of which is based on the desired rotation angle. As shown, bias voltage 207 controls signal amplitude controller 203, while bias voltage 208 controls signal amplitude controller 204. When the signal receiver 102 detects that its input signal 107 is below the quality threshold, the signal receiver 102 generates the two bias voltages 207, 208 and supplies them as the control signal 108 to the signal amplitude controllers 203,204. Upon receiving their respective bias voltages 207,208, the signal amplitude controllers 203,204 adjust the amplitudes of the signals 205,210 received by the antenna elements 201,202—to which they are respectively coupled—according to the corresponding bias voltage 207,208.

Thus, the signal amplitude controller 203 adjusts the amplitude of the signal 205 received by antenna element 201 to produce an output adjusted signal 206. This adjusted signal 206 might have a smaller amplitude or the same amplitude as the received signal 205 depending on the selected bias voltage versus rotation angle relationship. In a preferred embodiment, bias voltage 207 varies as a piece-wise sine function versus rotation angle. Similarly, the signal 210 received by antenna element 202 is adjusted by signal amplitude controller 204 in response to the applied bias voltage 208 to produce an output adjusted signal 211. In the preferred embodiment, bias voltage 208 varies as a piece-wise cosine function versus rotation angle. The adjusted signals 206, 211 are supplied to the combiner 209 where they are combined to form an updated input signal 107 for use by the signal receiver 102. The updated signal 107 is substantially equivalent to the signal that the signal receiver 102 would receive had the composite antenna pattern been mechanically rotated from its initial orientation by the desired rotation angle.

Figure 3:
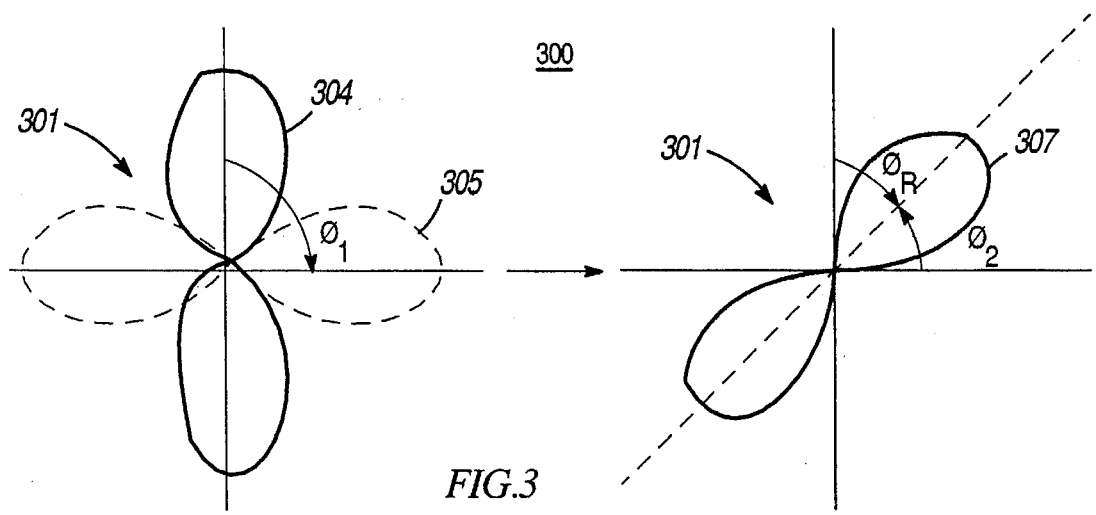
FIG. 3 illustrates a preferred antenna pattern before, and after, rotation by a rotation angle, in accordance with the present invention.

FIG. 3 illustrates electric field (E) plane views 300 of a preferred antenna pattern before, and after, rotation by a rotation angle $\theta_R$, in accordance with the present invention. As briefly mentioned above, the antenna section 101 and each antenna element 201,202 are characterized by a corresponding antenna pattern (e.g., 304). As is also mentioned above, the antenna's receiving elements 103, including elements 201,202, preferably comprise orthogonal one-half wavelength dipoles. Thus, in the preferred embodiment, each of the two elements 201,202 of the antenna section 101 is characterized by one of the two patterns 304, 305 depicted in E-plane view 301. With reference to FIG. 2, antenna element 201 is characterized by antenna pattern 304 and antenna element 202 is similarly characterized by antenna pattern 305. However, in an alternate embodiment that uses only one antenna element, the corresponding antenna pattern might be either of the two patterns 304, 305 shown depending upon the antenna element's physical orientation. For the remainder of this discussion, it is assumed that the antenna section 101 includes either one or two antenna elements and that the single antenna element is characterized by antenna pattern 304, while the pair of antenna elements are characterized by antenna patterns 304, 305.

When antenna pattern re-orientation is required based on the signal receiver's quality metric determination, either antenna pattern 304, or the combination of antenna patterns 304, 305, is oriented to improve the signal quality metric. In the case of a single antenna element, the re-orientation might be in the form of a mechanical rotation of the antenna element; whereas, in a preferred case of two orthogonal antenna elements 201,202, the re-orientation is performed by electrically altering the combination of antenna patterns 304, 305 as described with reference to FIG. 2. Regardless of whether the antenna section 101 comprises one or two antenna elements 103, it is assumed for this discussion that the overall antenna pattern is initially characterized by the antenna pattern 304 oriented at an initial orientation angle $\theta_1$. After the overall antenna pattern is rotated by a rotation angle $\theta_R$, via one of the aforementioned techniques (i.e., mechanically or electrically), the rotated antenna pattern 307 resides at new orientation angle $\theta_2$ as shown in E-plane view 302 of FIG. 3.

Figure 4:
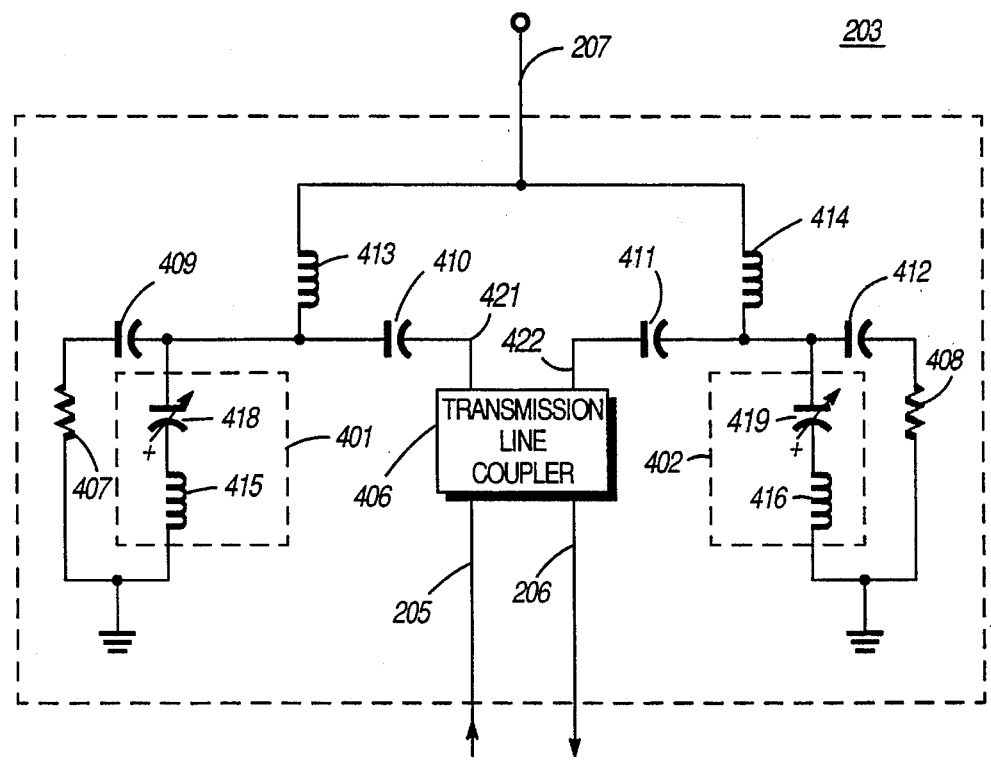
FIG. 4 illustrates a schematic and block diagram depiction of a signal amplitude controller, in accordance with a preferred embodiment of the present invention.

FIG. 4 illustrates a schematic and block diagram depiction of a signal amplitude controller 203, in accordance with a preferred embodiment of the invention. The signal amplitude controller 203 comprises a single phase, electrically controllable attenuator that includes two adjustable impedances 401, 402, a transmission line coupler 406, termination resistors 407, 408, RF coupling capacitors 409–412, and RF chokes 413, 414. In a preferred embodiment, adjustable impedance 401 comprises a voltage variable capacitor 418 (e.g., a varactor diode) and an inductor 415 that is grounded at one end. Similarly, adjustable impedance 402 also comprises a voltage variable capacitor 419 and an inductor 416 that is grounded at one end. The transmission line coupler 406 preferably comprises a well-known 3 dB branchline coupler.

Operation of the preferred signal amplitude controller 203, in response to an input signal 205 and an applied bias voltage 207, occurs in the following manner. The input signal 205 enters the transmission line coupler 406 where it is divided into two signals 421, 422 of substantially equal amplitude. The first signal 421 is applied, via RF coupling capacitor 410, to an impedance produced by adjustable impedance 401 in parallel with the series impedance provided by RF coupling capacitor 409 and termination resistor 407. RF coupling capacitors 409, 410 are preferably capacitors with negligible reactance at the operating frequency of the signal amplitude controller 203. Thus, the RF coupling capacitors 409, 410 are effectively short circuits at the operating frequency, while prohibiting the DC current provided by a source of the applied bias voltage 207 from flowing through the transmission line coupler 406 and the termination resistor 407. It should be noted that the first signal 421 remains isolated from the source of the applied bias voltage 207 due to the presence of RF choke 413.

Upon encountering the parallel impedance, the first signal 421 is divided into a forward component and a reflected component depending on the applied bias voltage 207. As mentioned above, the applied bias voltage 207 preferably comprises a piece-wise sine function versus rotation angle. Thus, the applied bias voltage 207 varies from a maximum positive value to a minimum negative value. When the applied bias voltage 207 is at its minimum negative value, voltage variable capacitor 418 and inductor 415 are series resonant. In this case, the first signal 421 is completely reflected by the parallel impedance (i.e., the short circuit produced by voltage variable capacitor 418 and inductor 415) and comprises only the reflected component. When the applied bias voltage 207 is increased from its minimum value, the amount of energy in the forward component increases and the amount of energy in the reflected component decreases. Accordingly, as the applied bias voltage 207 varies, the amount of energy reflected back into the transmission line coupler 406 also varies. It should be noted that the forward component of the first signal 421 is absorbed by termination resistor 407, which is preferably 50 ohms at the operating frequency.

In a similar manner, a reflected component of the second signal 422 is produced in response to the applied bias voltage 207 by reflection of the second signal 422 from the equivalent parallel impedance presented by adjustable impedance 402 and termination resistor 408. This reflected component comprises the amount of energy reflected back into the transmission line coupler 406 due to reflection of the second signal 422. Thus, at a particular applied bias voltage 207, a percentage of the input signal 205 (i.e., the reflected components of the two signals 421, 422) that passes through the transmission line coupler 406 is then reflected back into the transmission line coupler 406 in response to the applied bias voltage 207—i.e., in proportion to the desired antenna pattern rotation angle. Due to the electrical construction of the transmission line coupler 406, the percentage of the input signal 205 reflected back into the transmission line coupler 406 exits the transmission line coupler 406 as the output adjusted signal 206. Thus, the amplitude of the output adjusted 206 varies in response to the desired rotation angle. By using the preferred signal amplitude controller 203, the overall antenna pattern can be effectively rotated by as much as 180 degrees from its original orientation angle.

In an alternate embodiment of each adjustable impedance 401, 402, the series combination of the voltage variable capacitor (e.g., 418) and the inductor (e.g., 415) might be replaced with a DC-biased PIN diode. In yet another embodiment of the present invention, an additional inductor (not shown) might be connected in parallel with each adjustable impedance 401,402, such that, when the applied bias voltage 207 is at its minimum value, the effective impedance presented by the adjustable impedance (e.g., 418) in parallel with the inductor (e.g., 415) is an open circuit, as opposed to the short circuit of the serially connected voltage variable capacitor 418 and inductor 415.

As mentioned above, the preferred signal amplitude controller 203 (i.e., the single phase attenuator) is used to provide electrical rotation of the overall antenna pattern from 0 to 180 degrees. This amount of rotation is sufficient for rotating symmetrical antenna patterns, such as those produce by one-half wavelength dipoles. However, depending on the chosen antenna elements, the overall antenna pattern might not be symmetrical. Thus, the above described signal amplitude controller 203 might not provide sufficient antenna pattern rotation. In this case, the single phase attenuator of FIG. 4 might be converted into a bi-phase attenuator by replacing each serially connected voltage variable capacitor 418, 419 and inductor 415, 416 with a pair of serially connected voltage variable capacitors and inductors separated by a one-quarter wavelength transmission line as shown in FIG. 5.

FIG. 5 illustrates an alternate embodiment of adjustable impedance 401 in accordance with converting a single phase attenuator into a bi-phase attenuator. The alternate adjustable impedance 401 includes two voltage variable capacitors 501, 502, each being serially connected to a corresponding inductor 504, 505 that is grounded at one end. The voltage variable capacitors 501, 502 are separated by a one-quarter wavelength transmission line 507, as shown. Thus, in this configuration, adjustable impedance 401 comprises a first voltage variable capacitor 501 in series with a first inductor 504, a second voltage variable capacitor 502 in series with a second inductor 505, and a one-quarter wavelength transmission line 507 interconnecting the two voltage variable capacitors 501, 502.

To complete the conversion from the single phase attenuator to the bi-phase attenuator, the serially connected voltage variable capacitor 419 and inductor 416 of adjustable impedance 402 are similarly replaced with two voltage variable capacitors, two inductors, and a one-quarter wavelength transmission line as in alternate adjustable impedance 401. The voltage variable capacitors 501, 502 are oriented opposite in polarity and each adjustable impedance 401, 402 is a mirror image of the other so that proper phase addition of the reflected signal components occurs prior to reentry of the composite reflected signal into the transmission line coupler 406. By using the bi-phase attenuator, the overall antenna pattern can be rotated from 0 to 360 degrees from its original orientation angle.

FIG. 6 illustrates an exemplary logic flow diagram 600 of steps executed by a receiver, in accordance with the present invention. The logic flow begins when the signal receiver determines (601) signal characteristics of a received signal. This determination preferably comprises identifying whether the received signal contains voice, data, or video information. Next, the signal receiver determines (602) a first quality threshold based on the determined signal characteristics. In a preferred embodiment, the first quality threshold is the minimum acceptable quality level that the received signal need attain to be accepted by the signal receiver. In the preferred embodiment, the received signal comprises a digitally modulated voice or data signal. Accordingly, the first quality threshold is preferably based on a transmission rate of the received signal. As is known, when the transmission rates of digital data and voice signals increase, the impact of bit errors incurred by those signals also increases, albeit in different proportions. Thus, when a digital data signal and an encoded digital voice signal are transmitted at equivalent transmission rates (e.g., 128 kilobits per second), the data signal requires a higher signal strength and, correspondingly, a higher quality threshold than the encoded voice signal because the encoded voice signal is more tolerant to bit errors than is the data signal.

In alternate embodiments of the present invention, the first quality threshold might be based on a fading tolerance of the signal or an error coding of the signal. Fading tolerance is the ability of the signal to be correctly demodulated in the presence of transmission channel fading. The fading tolerance is impacted by the speed at which the receiver moves (e.g., in an automobile), with higher speeds generally resulting in lower fading tolerances than lower speeds. In digital transmissions, the fading tolerance is directly related to the error coding incorporated in the digital signal prior to transmission. That is, the more extensive the error coding, the more tolerant the transmitted digital signal, and subsequently received signal, is to transmission fading. Accordingly, the first quality threshold might increase as the fading tolerance or amount of error coding decreases.

Upon determining (602) the first quality threshold, the signal receiver determines (603) a second quality threshold based on the signal characteristics. The second quality threshold is preferably related to the fading tolerance of the received signal and is used to provide for hysteresis during the rotation of the antenna pattern. In a preferred embodiment, the second quality threshold establishes a more stringent quality standard for the received signal as compared to the first quality threshold. Thus, the second quality threshold introduces a quality margin above the minimum acceptable quality level (i.e., the first quality threshold) to minimize the frequency of antenna pattern rotation. Similar to the first quality threshold, the second quality threshold is selected in response to whether the received signal is a voice or a data signal. It should be noted that the first and second quality thresholds may be preset in memory when the receiver is to be used for receiving either only voice or only data, and not both. However, in a preferred embodiment, the first and second quality thresholds are dynamically adjusted in response to the received signal characteristics during operation of the receiver.

After determining (602, 603) the quality thresholds, the signal receiver determines (604) whether or not the quality thresholds need to be adjusted. The quality thresholds need to be adjusted when they are set for one type of signal characteristic and another type of signal characteristic is contained in the received signal. For example, when the quality thresholds are set for reception of a voice signal and a data signal is received, the quality thresholds need to be adjusted to account for the change in signal characteristics. When the quality thresholds require an adjustment, the signal receiver adjusts (605) the quality thresholds in response to the identified signal characteristics. In a preferred embodiment, this adjustment is performed by changing the values of the quality thresholds such that they correspond to the characteristics of the received signal.

When the first quality threshold does not need adjusting (604), or after the first quality threshold has been adjusted (605), the signal receiver determines (606) a signal quality metric of the received signal. In a preferred embodiment, this determination comprises measuring a word error probability of the received signal. The word error probability (sometimes referred to as word error rate) is the probability that any digital word, or block of bits, in a data packet contains an error. The word error probability is preferably obtained by measuring the number of word errors in a group of digital words and dividing the number of errors by the number of measured words. In alternate embodiments, the signal quality metric might be a bit error rate (BER), a received signal strength indication (RSSI), or a carrier-to-interference plus noise (C/I+N) ratio. It should be noted that the units of the first and second quality thresholds correspond to the type of signal quality metric. For example, when the signal quality metric is a word error probability or a BER, the first and second quality thresholds are dimensionless units corresponding to probability; whereas, when the signal quality metric is an RSSI or a C/I+N, the first and second quality thresholds might be in units of decibels (dB).

Upon determining (606) the signal quality metric of the received signal, the signal receiver compares (607) the signal quality metric to the first quality threshold. When the signal quality metric is below the first quality threshold, the signal receiver instructs the antenna to rotate (608) the antenna pattern by a first rotation angle, such that the antenna pattern is rotated from an initial orientation angle to a new orientation angle. As described above with reference to FIG. 3, the antenna pattern might be mechanically or electrically rotated by the first rotation angle. The first rotation angle is selected based on the transmission environment through which the received signal traveled prior to reception and the receiver's frequency of operation. The first rotation angle might be any angle from 1 to 180 degrees provided that the signal received at the new orientation angle is substantially decorrelated from the signal received at the initial orientation angle. For example, in a multipath transmission environment at a receiver operating frequency of 800 MHz, a first rotation angle of approximately 8 degrees produces sufficient decorrelation between subsequently received signals.

Upon rotating (608) the antenna pattern by the first rotation angle, the signal receiver again determines (606) the signal quality metric of the received signal. This updated signal quality metric is then compared (607) to the first quality threshold. When the updated signal quality metric is below the first quality threshold, the signal receiver instructs (608) the antenna to incrementally rotate the antenna pattern by the first rotation angle. This "measure and rotate" procedure continues until the signal quality metric equals, or exceeds, the first quality threshold.

When the signal quality metric is at least equal to the first quality threshold, the signal receiver compares (609) the signal quality metric to a second quality threshold. When the signal quality metric is below the second quality threshold, the signal receiver directs the antenna to rotate (610) the antenna pattern by a second rotation angle. In a preferred embodiment, the second rotation angle is substantially equal to the first rotation angle; however, in an alternate embodiment, the two rotation angles might be distinct. In a manner similar to that discussed with regard to the incremental rotation of the antenna pattern by the first rotation angle, the receiver performs a "measure and rotate" procedure using the second rotation angle until the signal quality metric equals, or exceeds, both the first and second quality thresholds. Once the signal quality metric meets this criterion, the logic flow ends (611).

The present invention provides a method and apparatus for producing diversity gain of a time-varying signal received by an antenna in a receiver. With this invention, diversity gain of a received signal is produced using only one antenna, in contrast to the costly and complex multiple antennas required in prior art space diversity systems, without necessitating redundant signal transmissions, as is required in throughput inefficient, single antenna time diversity systems. Further, the present invention requires receiving a signal over only one frequency, as opposed to receiving signals over multiple frequencies as in spectrally inefficient frequency diversity systems. Still further, the present invention reduces the probability of producing distortion in the received signal as is produced by existing, continuous antenna rotation systems, such as those used in radar systems. Accordingly, these improvements result in higher data throughput capability at lower costs.

What is claimed is:

1. In a receiver that includes an antenna, the antenna being characterized by a predetermined antenna pattern oriented at a first orientation angle and being used to receive signals that are subject to a time-variant fading condition, the antenna including a first antenna element and a second antenna element, the first antenna element being characterized by a first antenna pattern and the second antenna element being characterized by a second antenna pattern, the first antenna pattern and the second antenna pattern together producing the predetermined antenna pattern, a method for producing diversity gain of a signal received by the antenna, the method comprising the steps of:

a) determining a signal quality metric of the signal;

b) comparing the signal quality metric to a quality threshold; when the signal quality metric is below the quality threshold:

c) adjusting an amplitude of the signal received by the first antenna element based on a rotation angle to produce a first signal;

d) adjusting an amplitude of the signal received by the second antenna element based on the rotation angle to produce a second signal; and e) combining the first signal and the second signal to produce a combined signal, such that the predetermined antenna pattern is effectively rotated from the first orientation angle by the rotation angle.

2. The method of claim 1, wherein the step of determining comprises the step of measuring a word error probability.

3. The method of claim 1, further comprising the step of determining the quality threshold based on a transmission rate of the signal.

4. The method of claim 1, further comprising the step of determining the quality threshold based on an error coding of the signal.

5. The method of claim 1, further comprising the step of determining the quality threshold based on a fading tolerance of the signal.

6. The method of claim 1, wherein the first antenna element is positioned substantially orthogonal to the second antenna element.

7. The method of claim 1, wherein the antenna further includes a first signal amplitude controller operably coupled to the first antenna element and wherein step (c) further comprises the step of applying a first bias voltage to the first signal amplitude controller, wherein the first bias voltage is based on the rotation angle.

8. The method of claim 7, wherein the antenna further includes a second signal amplitude controller operably coupled to the second antenna element and wherein step (d) further comprises the step of applying a second bias voltage to the second signal amplitude controller, wherein the second bias voltage is based on the rotation angle.

9. The method of claim 1, wherein the first antenna element and the second antenna element occupy a spatial aperture of, at most, one-half wavelength of a minimum operating frequency of the antenna.

10. In a receiver that includes only one antenna, the antenna being characterized by a predetermined antenna pattern oriented at a first orientation angle and being used to receive signals that are subject to a time-variant fading condition, the antenna including a first antenna element and a second antenna element, the first antenna element being characterized by a first antenna pattern and the second antenna element being characterized by a second antenna pattern, the first antenna pattern and the second antenna pattern together producing the predetermined antenna pattern, a method for producing diversity gain of a signal received by the antenna, the method comprising the steps of:

a) determining a signal quality metric of the signal;

b) comparing the signal quality metric to at least two quality thresholds;

when the signal quality metric is below at least one of the at least two quality thresholds:

c) adjusting an amplitude of the signal received by the first antenna element based on a rotation angle to produce a first signal;

d) adjusting an amplitude of the signal received by the second antenna element based on the rotation angle to produce a second signal; and e) combining the first signal and the second signal to produce a combined signal, such that the predetermined antenna pattern is effectively rotated from the first orientation angle by the rotation angle.

11. The method of claim 10, further comprising the step of adjusting a first quality threshold of the at least two quality thresholds in response to a characteristic of the signal.

12. The method of claim 11, further comprising the step of determining whether the signal has a characteristic of a data signal.

13. The method of claim 10, further comprising the step of determining a first quality threshold of the at least two quality thresholds based on a transmission rate of the signal.

14. The method of claim 13, further comprising the step of determining a second quality threshold of the at least two quality thresholds based on a fading tolerance of the signal.

15. The method of claim 10, wherein the antenna further includes a first signal amplitude controller operably coupled to the first antenna element and wherein step (c) further comprises the step of applying a first bias voltage to the first signal amplitude controller, wherein the first bias voltage is based on the rotation angle.

16. The method of claim 15, wherein the antenna further includes a second signal amplitude controller operably coupled to the second antenna element and wherein step (d) further comprises the step of applying a second bias voltage to the second signal amplitude controller, wherein the second bias voltage is based on the rotation angle.

17. In a receiver that includes an antenna, wherein the antenna is characterized by a predetermined antenna pattern and is used to receive signals that are subject to a time-variant fading condition, a method for producing diversity gain of a signal received by the antenna, the method comprising the steps of:

a) measuring a word error probability of the signal;

b) comparing the word error probability to a first threshold that is based on a transmission rate of the signal;

c) comparing the word error probability to a second threshold that is based on a fading tolerance of the signal;

d) when the word error probability is below the first threshold, rotating the predetermined antenna pattern by at least one first rotation angle increment until the word error probability is improved, thereby producing the diversity gain; and e) when the word error probability is below the second threshold, rotating the predetermined antenna pattern by at least one second rotation angle increment until the word error probability is improved, thereby producing the diversity gain.

18. The method of claim 17, wherein the antenna includes a first antenna element, a second antenna element, a first signal amplitude controller that is operably coupled to the first antenna element, and a second signal amplitude controller that is operably coupled to the second antenna element, wherein the first antenna element is characterized by a first antenna pattern and the second antenna element is characterized by a second antenna pattern, wherein the first antenna pattern and the second antenna pattern together produce the predetermined antenna pattern, and wherein the step of rotating the predetermined antenna pattern by at least one first rotation angle increment comprises the steps of:

d1) applying a first bias voltage to the first signal amplitude controller, wherein the first bias voltage is based on the at least one first rotation angle increment;

d2) adjusting, by the first signal amplitude controller, an amplitude of the signal received by the first antenna element based on the first bias voltage to produce a first signal;

d3) applying a second bias voltage to the second signal amplitude controller, wherein the second bias voltage is based on the at least one first rotation angle increment;

d4) adjusting, by the second signal amplitude controller, an amplitude of the signal received by the second antenna element based on the second bias voltage to produce a second signal; and d5) combining the first signal and the second signal to produce a combined signal, such that the predetermined antenna pattern is effectively rotated by the at least one first rotation angle increment.

19. A receiver that includes an antenna and a signal receiver, wherein the antenna is characterized by a predetermined antenna pattern and is used to receive signals that are subject to a time-variant fading condition, wherein the receiver provides diversity gain of a signal received by the antenna, and wherein the antenna comprises:

a first antenna element that receives the signal, wherein the first antenna element is characterized by a first antenna pattern;

a second antenna element, positioned substantially orthogonal to the first antenna element, that receives the signal, wherein the second antenna element is characterized by a second antenna pattern and wherein the first antenna pattern and the second antenna pattern together produce the predetermined antenna pattern;

a first signal amplitude controller, operably coupled to the first antenna element, that adjusts an amplitude of the signal received by the first antenna element;

a second signal amplitude controller, operably coupled to the second antenna element, that adjusts an amplitude of the signal received by the second antenna element; and a combiner, operably coupled to the first signal amplitude controller, the second signal amplitude controller, and the signal receiver, that combines an output of the first signal amplitude controller and an output of the second signal amplitude controller to produce a combined output, and provides the combined output to the signal receiver.

20. The receiver of claim 19, wherein the first antenna element and the second antenna element each comprises a one-half wavelength dipole.

21. The receiver of claim 19, wherein the first signal amplitude controller and the second signal amplitude controller each comprises an electrically controllable attenuator.

22. The receiver of claim 21, wherein the electrically controllable attenuator comprises at least one voltage variable capacitor.

23. The receiver of claim 22, wherein the electrically controllable attenuator further comprises at least one one-quarter wavelength transmission line and a transmission line coupler.

24. The receiver of claim 21, wherein the electrically controllable attenuator comprises at least one PIN diode.

* * * * *